Jan. 1, 1929.

C. R. ANDERSON

DAMPER

Filed May 9, 1928

1,697,100

Carl R. Anderson
INVENTOR.

BY

ATTORNEYS.

Patented Jan. 1, 1929.

1,697,100

UNITED STATES PATENT OFFICE.

CARL R. ANDERSON, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

DAMPER.

Application filed May 9, 1928. Serial No. 276,415.

Stove dampers have been made having their spindles united with a handle by welding. Such structures as heretofore made have required a supplemental finish of the handle subsequent to the welding and most of such devices where used with spring return lock dampers have required an additional shoulder on the spindle against which the spring may operate. The present invention is designed to improve the structure so as to avoid the added finishing of the handle and to avoid the necessity for added devices as a spring shoulder. Features and details of the invention will appear from the specification and claims.

A preferred embodiment of the invention is illustrated in the accompanying drawings as follows:—

Figure 1:
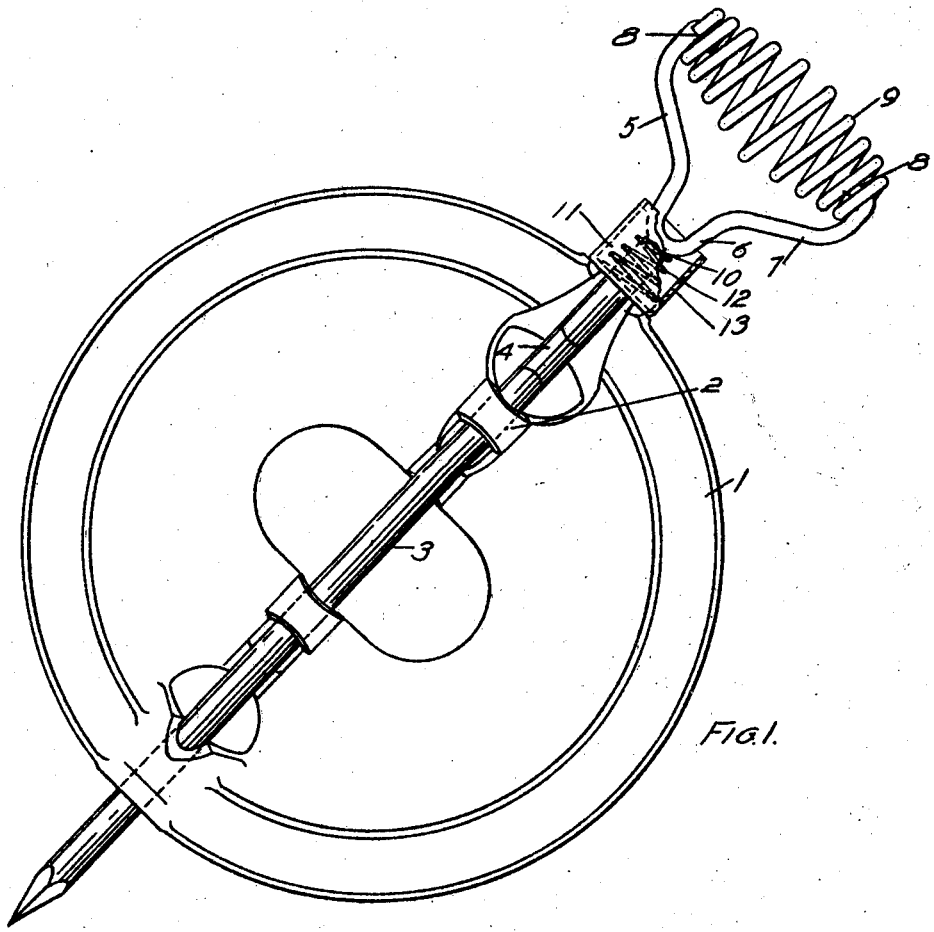

Fig. 1 shows a plan view of the damper.

Figure 2:
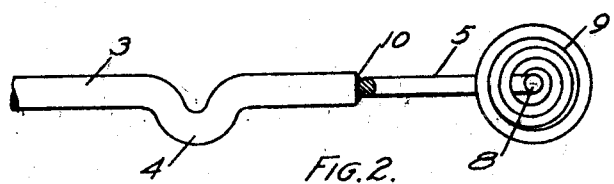

Fig. 2 a side elevation of the end of the spindle with the handle in section.

1 marks the damper plate, 2 the guide and locking loops on the plate, 3 the damper spindle and 4 the locking shoulder on the spindle. These are, or may be, of ordinary construction. A handle 5 has an inwardly extending loop 6 with an arm 7 extending from this loop, the outer end of the arm being turned inwardly at 8 and engaging a coiled wire grip 9.

The handle is secured to the end of the spindle by welding at 10, this welding being along the inner end of the loop 6.

A thimble 11 is arranged around the spindle and against the end of the plate. A spring 12 is also arranged around the end of the spindle and within the thimble, the outer end of the spring operating against the end of the loop 6, the end of the loop forming a shoulder against which the spring may act.

Walls 13 of the thimble extend outwardly a sufficient distance to house the spring and also to house the inner end of the loop 6 and the weld 10.

With this construction the handle 5 with its parts may be formed and finished by plating, or may, if desired, after it is finished be secured by welding to the end of the spindle. While this welding will destroy the finish locally it will not extend out a sufficient distance to require a re-finishing of the handle as the finish which is destroyed will extend into the thimble 13. Further the handle extending into the thimble forms a shoulder against which the spring may operate.

What I claim as new is:—

1. In a damper, the combination of a plate; a spindle extending from the plate; a handle formed with an inwardly extending loop, the inner end of the loop being welded to the end of the spindle, the outer ends of the loop being extended forming handle arms; and a thimble on the spindle into which the loop at the inner end of the handle extends, the thimble concealing the weld.

2. In a damper, the combination of a plate; a spindle extending from the plate; a handle formed with an inwardly extending loop, the inner end of the loop being welded on the end of the spindle and the outer ends of the loop being extended forming handle arms; a spring on the spindle operating against the inner end of the loop; and a thimble on the spindle into which the spring is placed and into which the loop extends, the thimble housing the spring and concealing the weld.

In testimony whereof I have hereunto set my hand.

CARL R. ANDERSON.